Nov. 13, 1962 J. B. DIEBOLD 3,063,372
APPARATUS FOR PERFORATING WELLS
Filed April 1, 1960 5 Sheets-Sheet 1

INVENTOR
Joe B. Diebold

BY John O. Evans, Jr.
ATTORNEY

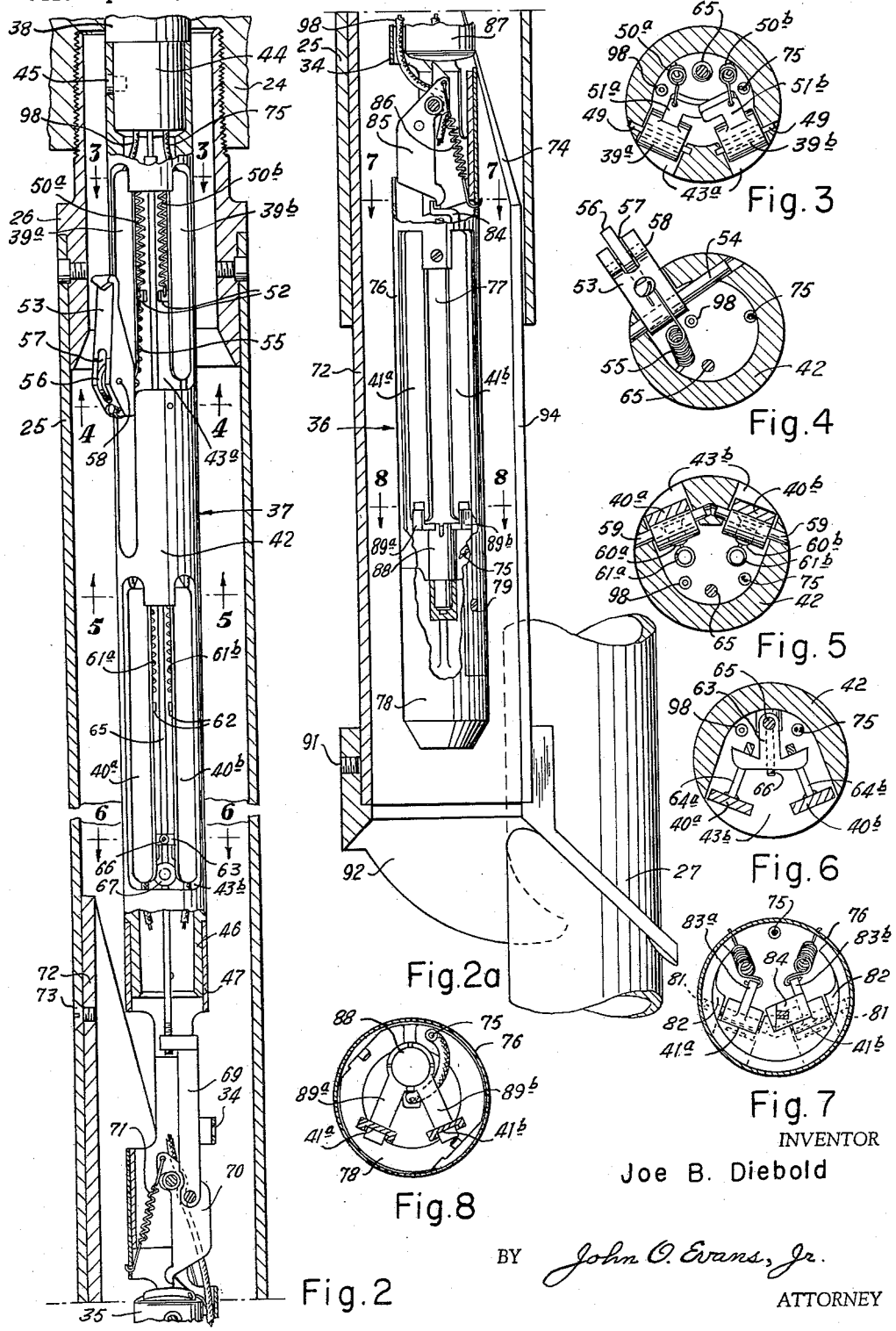

Nov. 13, 1962   J. B. DIEBOLD   3,063,372
APPARATUS FOR PERFORATING WELLS
Filed April 1, 1960   5 Sheets-Sheet 3
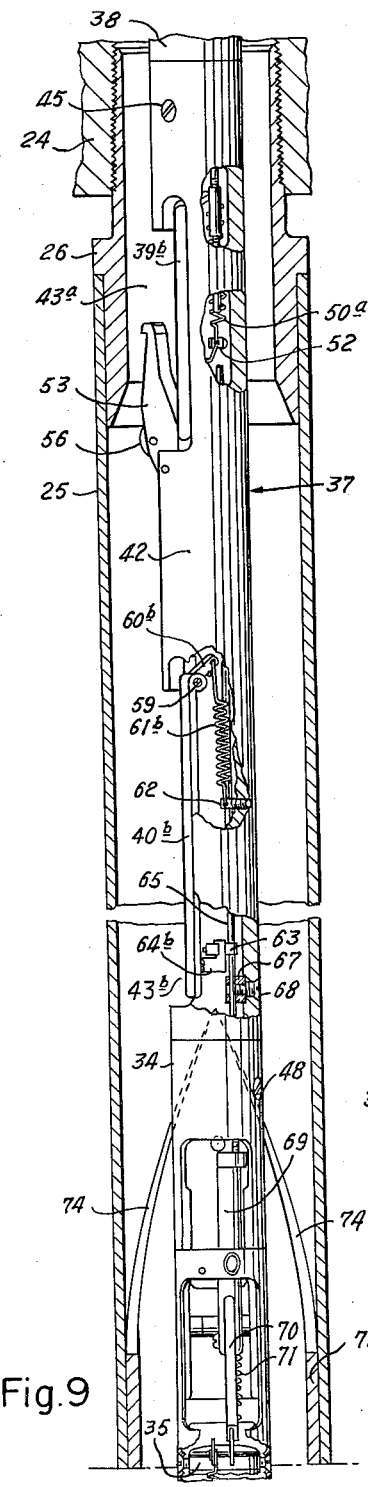
Fig. 9
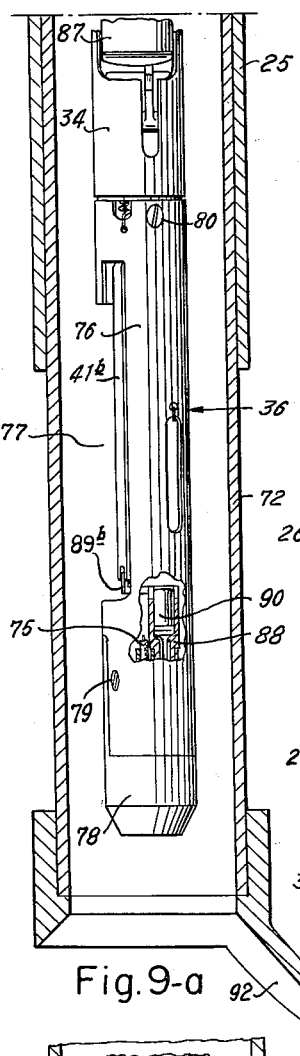
Fig. 9-a
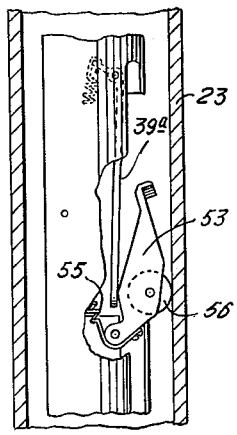
Fig. 10
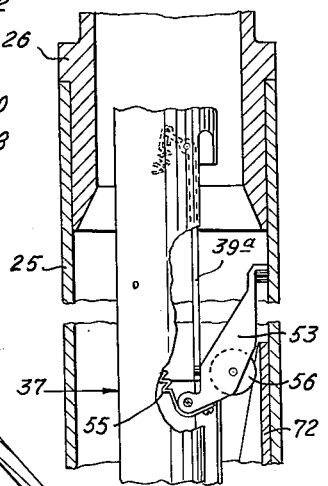
Fig. 11
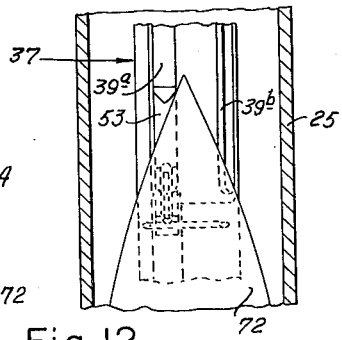
Fig. 12
INVENTOR
Joe B. Diebold
BY John O. Evans, Jr.
ATTORNEY Nov. 13, 1962 J. B. DIEBOLD 3,063,372
APPARATUS FOR PERFORATING WELLS
Filed April 1, 1960 5 Sheets-Sheet 4

INVENTOR
Joe B. Diebold

BY *John O. Evans, Jr.*
ATTORNEY

Fig. 16-A

INVENTOR
Joe B. Diebold

BY John O. Evans, Jr.
ATTORNEY

United States Patent Office 3,063,372
Patented Nov. 13, 1962

3,063,372
APPARATUS FOR PERFORATING WELLS
Joe B. Diebold, Arlington, Tex., assignor to Jet Research Center, Inc., Arlington, Tex., a corporation of Texas
Filed Apr. 1, 1960, Ser. No. 19,210
6 Claims. (Cl. 102—21.8)

The present invention relates to a method and apparatus for perforating wells. More particularly, the invention relates to a method and apparatus for perforating a well, such as an oil, gas or water well, having disposed therein multiple strings of tubing for producing the well from two or more productive zones. Still more specifically, the invention relates to a method and apparatus for perforating a well adjacent to an existing string of tubing to prevent damage to the string of tubing.

In well bores that penetrate a plurality of productive zones, it is often desirable to permanently set one or more tubing strings prior to completing the well for oil or gas production. Such an arrangement permits the well head equipment to be set in place and the heavy drilling mud in the well bore to be replaced by a clean fluid such as oil or salt water before perforation is accomplished. A substantial saving in manpower and heavy equipment cost is realized by such an arrangement.

One of the problems posed in such a completion arrangement is development of efficient, small diameter perforating assemblies that can be run into the well through the tubing to perforate the casing and well bore walls below the end of the tubing string. A particularly effective perforating apparatus has been developed in which the perforating units are in axial alignment with the tubing upon passage therethrough, but pivot to a horizontal position upon emergence of the perforating apparatus from the bottom of the tubing. This perforating apparatus is disclosed in the application for United States Letters Patent filed October 8, 1954 by Blake M. Caldwell and Harrold D. Owen, Serial No. 461,236, entitled "Well Perforating Assembly," and in an article entitled "A New Tool for Perforating Casing Below Tubing" by Caldwell et al., Journal of Petroleum Technology, December, 1954, pages 24 to 36.

In a dual completion well, there is often a second string of tubing axially off-set and extending a substantial distance below the open end of a first string of tubing. A major problem in perforating the well adjacent to this second string of tubing with through-tubing perforating apparatus is in orienting the perforating apparatus so as not to perforate the second tubing string when the perforator is fired. An additional problem is the blast damage to the second tubing string from the perforating apparatus when it is positioned parallel and closely adjacent to the second string of tubing and fired.

It is therefore an object of the present invention to provide a method of perforating a well adapted for dual and multiple string completion.

Another object of the present invention is to provide a perforating apparatus that can be positioned in the well to perforate the well bore wall without perforating adjacent tubing.

Still another object of the present invention is to provide a perforating apparatus that will not damage adjacent tubing by a blast effect when fired.

A further object of the present invention is to provide a well tool orienting apparatus for attachment to the lower end of an open string of tubing.

The present invention, in general, includes a method for perforating a well that has at least two strings of tubing arranged in the well bore with a second string of tubing extending below the open end of the first string of tubing. A perforating apparatus is lowered by a cable from the earth's surface through the first string of tubing and oriented in the well bore as it passes out of the end of the first string of tubing. In the oriented position, adjacent and parallel to the second string of tubing, the perforating apparatus has its operative surface directed toward the well bore and away from the second tubing string. The perforating apparatus is then moved laterally away from the second string of tubing and thereafter fired to perforate the well wall below the first string of tubing and adjacent to the second tubing string without damage to the second string of tubing.

The present invention further includes, in general, a well perforating assembly for perforating a well having disposed therein a first tubing string open at the lower end and a second tubing string axially off-set from and extending below the lower end of the first tubing string. The assembly includes a cable suspended vertically elongated carrier with well perforating units mounted therein. The carrier and perforating units are adapted to pass through the first tubing string and to be positioned at the side of the second string of tubing to perforate the well below the first tubing string. An orienting cam follower on the carrier is adapted to cooperate with a cam surface on the lower end of the first tubing string to orient the carrier so that the perforating units are directed toward the wall of the well and away from the second tubing string. A pair of movably mounted arms within the carrier are adapted to project outwardly from the carrier to embrace the second string of tubing to retain the carrier in its oriented position after disengagement from the orienting cam. Means are provided in the carrier to move the arms outwardly as the perforating assembly passes out of the end of the first tubing string. Upper and lower pairs of pusher legs are movably mounted within the carrier and adapted upon release to project outwardly from the carrier to move the carrier laterally away from the second string of tubing. Release means and spring means are provided in the carrier for movement of the pusher legs to the outward position. The release means is adapted to be actuated from the earth's surface when the perforating assembly has been vertically positioned in the well. When the perforating assembly has been moved laterally away from the second tubing string, the perforating units are fired to perforate the well wall. The portion of the perforating assembly not destroyed by the detonation of the perforating units is retrieved to the earth's surface by the suspending cable for re-use.

The foregoing and other objects, features and advantages of the present invention will be apparent from a consideration of the following specification taken in conjunction with the accompanying drawings in which like reference characters designate the same or similar parts throughout the several views.

In the drawings:

FIG. 2 is a vertical, partial section view of the upper part of the perforating apparatus disposed in the upper part of a tubing extension member;

FIG. 2A is a vertical, partial section view of the lower end of the structure in FIG. 2;

FIG. 3 is a cross section view taken on the line 3—3 of FIG. 2;

FIG. 4 is a cross section view taken on the line 4—4 of FIG. 2;

FIG. 5 is a cross-section view taken on the line 5—5 of FIG 2;

FIG. 6 is a cross-section view taken on the line 6—6 of FIG. 2;

FIG. 7 is a cross-section view taken on the line 7—7 of FIG. 2A;

FIG. 8 is a cross-section view taken on the line 8—8 of FIG. 2A;

FIG. 9 is a vertical, partial section view of the apparatus in FIG. 2 axially rotated 90 degrees;

FIG. 9A is a vertical, partial section view of the apparatus in FIG. 2A axially rotated 90 degrees;

FIG. 10 is a vertical, partial section view of the cam follower of FIGS. 2 and 9 in the tubing;

FIG. 11 is a vertical, partial section view of the cam follower of FIGS. 2 and 9 in the tubular extension;

FIG. 12 is a vertical, partial section view of the apparatus of FIG. 11 looking from the right-hand side;

FIG. 16A is a vertical, partial section view of the lower end of the apparatus of FIG. 16;

Figure 1:
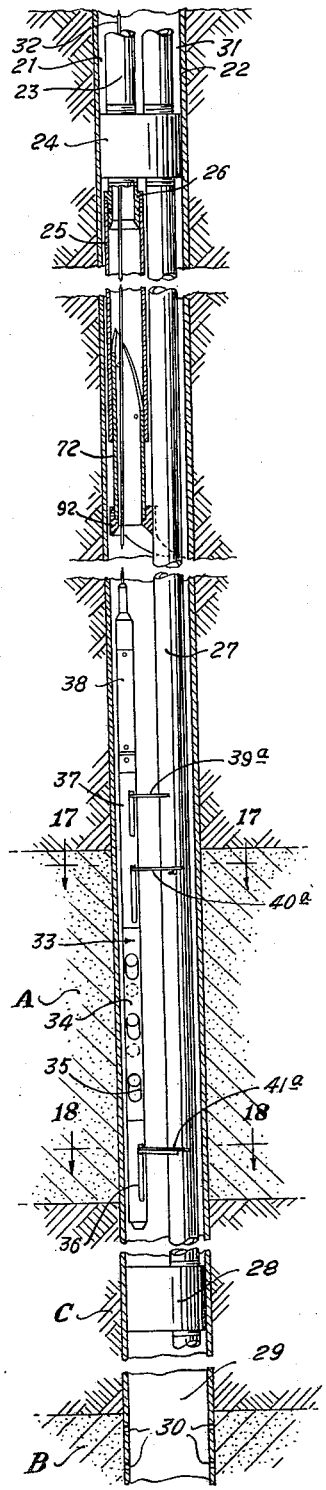
FIG. 1 is a longtudinal, partial section view of exemplary apparatus in accordance with the present invention disposed in a well adapted for dual completion.

Referring now to FIG. 1, a well bore 21 extends through an upper hydrocarbon productive earth formation A and into a lower hydrocarbon productive earth formation B separated from the upper formation by a non-productive earth formation C. In the well bore, a casing 22 extends from the earth's surface through the formation A and C and at least into formation B. The casing may be surrounded with a layer of cement (not shown) over a portion of its length.

Disposed in the casing is a first tubing string 23, suspended from conventional well head equipment on the surface of the earth which threadably engages or is otherwise suitably coupled to the top of an upper packer 24. A tubular extension 25 is connected to the bottom of the packer 24 by a threaded nipple 26. The tubular extension 25 is axially aligned with the first tubing string 23 and communicates therewith by means of a passageway (not shown) provided in the packer 24. A second tubing string 27, axially off-set from the first tubing string 23, is connected to the bottom of the packer 24 and extends downward to connect to a lower packer 28. A passageway (not shown) provided in the lower packer 28 allows the second tubing string to communicate with the lower section 29 of the casing to permit movement of hydrocarbons from the lower earth formation B through perforations 30 to the surface of the earth. The second tubing string 27 may extend from the upper packer 24 to the well head equipment or, if conditions permit, the sections of tubing above the upper packer may be removed and the lower formation B produced through the upper section 31 of the casing 22 to the surface.

Suspended in the well bore 21 from the earth's surface by conductor cable 32 is a perforating apparatus 33 having an elongated carrier 34, perforating units 35, a bull nose member 36, an orienting and positioning member 37 and a firing head 38. The elongated carrier 34 is shown as having an open framework, as disclosed in the aforementioned application and article. The perforating units 35 are encapsulated shaped charge perforating units A firing head 38 suited for use in the present invention is also described and illustrated in the aforementioned application and article.

As seen in FIG. 1, the orienting and positioning member 37 has horizontally extending therefrom two pivotal orienting arms 39a and 39b and two pivotal upper pusher legs 40a and 40b (only one each can be seen in FIG. 1). Two pivotal lower pusher legs 41a and 41b (only one can be seen in FIG. 1) extend horizontally from the bull nose number 36.

Referring now primarily to FIGS. 2, 3, 4, 5, 6 and 9, the orienting and positioning member 37 is shown disposed in the tubular extension 25. A thick walled, hollow, cylindrical housing 42 provides an upper vertical opening 43a and a lower vertical opening 43b therein. The upper end of the housing receives the reduced diameter lower end 44 of the firing head 38 and is attached thereto by screw 45. A reduced diameter lower end 46 of the housing 42 is received in an upstanding collar 47 on the upper end of carrier 34 and is attached thereto by screw 48. Pivotally mounted in the wall of the housing 42 by pins 49 are the two orienting arms 39a and 39b. Springs 50a and 50b are attached at their upper ends to lobes 51a and 51b which are integrally formed on the upper ends of orienting arms 39a and 39b. The lower ends of the springs are attached to the inner wall of the carrier by screws 52. Immediately below arm 39a and in engagement therewith is the pivotally mounted cam follower 53. The cam follower is pivotally mounted in the wall of the housing 42 by a pin 54. A tension spring 55 is attached to the lower end of the cam follower and to one of the screws 52 to urge the cam follower outward from the housing 42. A rotatable wheel 56 is held in a recess 57 in the lower portion of the cam follower by pin 58. Extending below and continuous with the opening 43a is a vertical slot provided in the housing 42 to receive the cam follower when it swings down, as will be hereinafter described.

In the lower portion of the housing 42 the upper pusher legs 40a and 40b are pivotally mounted at their upper ends in the housing wall by pins 59. The pusher legs have off-set shanks 60a and 60b integrally formed on their upper ends, to which are attached springs 61a and 61b. The lower end of the tension springs are attached to screws 62 set in the inner wall of the housing. Upper pusher legs 40a and 40b are held in retracted positions in opening 43b in the carrier by a T member 63 which engages upturned fingers 64a and 64b projecting from the rear surface of pusher legs 40a and 40b, respectively. The T member is locked to a clevis extension rod 65 by screw 66 so that, upon upward movement of the extension rod, the T member disengages the fingers 64a and 64b allowing the pusher legs to extend horizontally from the carrier. A guide 67, attached to the wall of the carrier by screw 68, provides an opening therethrough to slidably receive the extension rod and prevent lateral movement thereof, the rod being vertically movable in the guide. Threadably attached to the lower end of the clevis extension rod 65 is a clevis 69 pivotally mounted on an upper release member 70. The upper release member is, in turn, pivotally mounted on the carrier 34 and is swung outwardly by spring 71 upon release by the detent on the uppermost perforating unit 35.

An electrical lead wire 75 passes through the perforating apparatus 33 and is connected to an explosive squib, hereinafter described, in the bull nose member 36.

The tubular extension 25 has a tubular cam member 72 received in its lower end and depending therefrom. The cam member is attached to the side wall of the tubular extension by screw 73. The upper end of the tubular cam member, contained within the tubular extension, is provided with downwardly sloping helical cam surfaces 74 which are opposite in hand. The cam surfaces intersect at their upper ends and terminate in a slot 94, provided in the wall of the cam member, at their lower ends.

Referring now primarily to FIGS. 2A, 7, 8 and 9A, wherein the bull nose member 36 is shown disposed in the tubular cam member 72, a thin walled, hollow, cylindrical housing 76, provides a vertical opening 77 therein. The housing 76 is closed at the lower end by a bull plug 78 attached to the housing by a screw 79. The upper end of the housing 76 is fitted over the lower end of the carrier 34 and is fastened thereto by a screw 80. A pair of lower pusher legs 41a and 41b are pivotally mounted at their upper ends by pins 81 received in reinforcing members 82 which are formed on the inside wall of the housing 76. Axially off-set shanks 83a and 83b are integrally formed at the upper ends of the lower pusher legs and are connected by springs to the housing 76. Shank 83b has a latching member 84 integrally formed therewith, which engages the lower end of lower release member 85. The lower release member is pivotally mounted on the housing 76 to swing outward under the force of the spring 86 when released by latch member 84. This, in turn, releases the lowermost perforating unit 87.

A frangible locking member 88, having two horizontally projecting upturned fingers 89a and 89b, is mounted in the bull plug 78. An explosive cartridge or squib 90 is contained within the frangible locking member 88 and is connected to a source of electrical energy at the earth's surface for firing by conventional lead wires, one lead wire being connected to the insulated conductor 75 from the firing head, and the other lead wire being grounded to the bull plug. The upturned fingers 89a and 89b engage the lower ends of pusher legs 41a and 41b, respectively, to retain them in the vertical position until the squib is fired.

Figure 19:
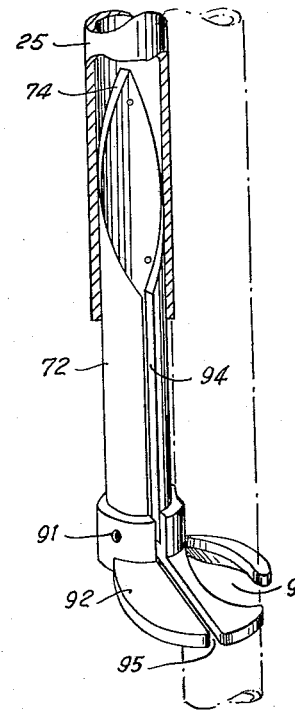
FIG. 19 is a vertical perspective view of the cam member and bell guide shoe member of FIG. 1.
Figure 15:
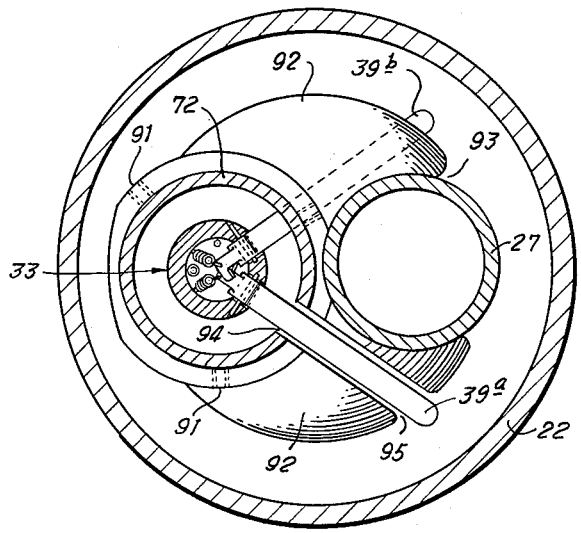
FIG. 15 is a cross-section view of a perforating apparatus as it passes through the bell guide shoe member of FIG. 19.

Attached to the lower end of the cam member 72 by a screw 91 is a bell guide shoe 92, as can best be seen in FIGS. 15 and 19. The guide shoe is generally annular in shape and provides a recess 93 in the periphery thereof to receive the second tubing string 27. A slot 95 is provided in the guide shoe which is aligned with, forms a continuation of, and is substantially the same width as slot 94 in the wall of the cam member 72.

The cooperation of the various structural members of the apparatus of the present invention may be best presented by way of description of the sequence of operations occurring when a well adapted for dual completion is perforated utilizing such apparatus.

The perforating apparatus 33 is run into the well bore on cable 32 through the first string of tubing 23. Oil or grease may be applied to the body of the perforating apparatus to reduce friction, particularly if the apparatus is run into a dry tubing string. As can be seen in FIG. 10, the wheel 56 on cam follower 53 engages the inner wall of the first tubing string 23 to prevent the end of the cam follower from being damaged by the wall of the tubing. The wheel also functions to lift the cam follower out of the space between tubing sections where they are joined by tubing collars. The tension of spring 55 is such that the weight of the perforating apparatus will maintain it substantially axially centered in the first tubing string. In the upright position assumed by the cam follower during passage through the first tubing string, the spring biased orienting arm 39a is maintained in a retracted vertical position inside the housing by engagement with the back side of the cam follower. Referring to FIG. 3, the lobe 51a on the upper end of orienting arm 39a engages the underside of the lobe 51b on orienting arm 39b, thus preventing orienting arm 39b from pivoting to the horizontal position until arm 39a is released by the cam follower.

Figure 13:
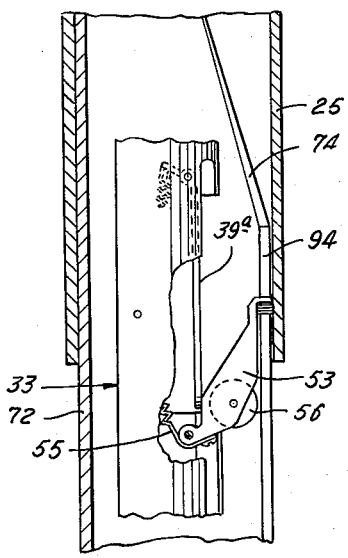
FIG. 13 is a vertical, partial section view of the cam follower in the lower end of the tubular extension.

The inside diameter of the passageway (not shown) in the upper packer 24 and the nipple 26 are selected to be substantially equal to that of the first tubing string 23 so that the cam follower 53 maintains the same position when passing therethrough as in the first tubing string. Referring now to FIG. 11, when the orienting and positioning member 37 passes into the tubular extension 25, which has a larger diameter than the first tubing string, the cam follower pivots outwardly to contact the inner wall of the tubular extension. As the perforating apparatus is lowered further through the tubular extension the upper end of the cam follower 53 will engage either the right or left hand cam surface 74 on the upper end of cam member 72, as can be seen in FIGS. 9 and 12. The cam follower will rotate the perforating apparatus 33 about its vertical axis until the upper end of the cam follower enters the slot 94 in the cam member 72, maintaining engagement with the inner wall of the tubular extension 25, as can be seen in FIG. 13. With the cam follower in the slot, further rotation of the perforating apparatus about the vertical axis is prevented, thus completing the step of orienting the perforating apparatus in relation to the second tubing string 27.

Figure 14:
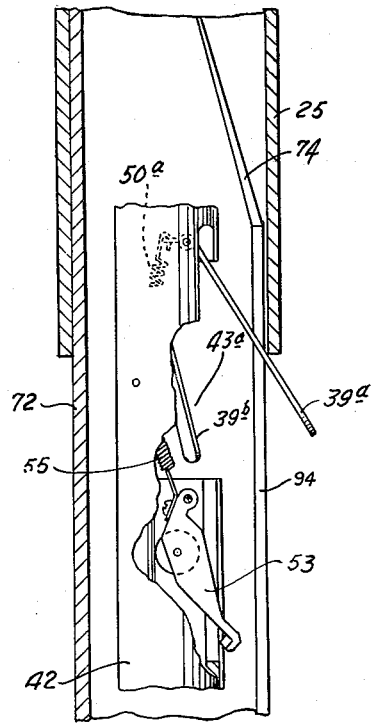
FIG. 14 is a vertical, partial section view of the cam follower and positioning arm in the slotted member of FIG. 19.

The cam follower 53 is of such thickness as to pass freely through the slot 94 in the cam member 72 when the downward movement of the perforating apparatus carries the cam member out of the end of the tubular extension 25. Referring to FIG. 14, the cam follower 53, urged by spring 55, then pivots downwardly through the slot and is retracted into the housing through the extension of opening 43a. When the cam follower pivots downwardly, the pivotally mounted orienting arm 39a is released and spring 50a urges the arm upward and outwardly through slot 94. Thus, orienting arm 39a replaces the cam follower 53 as the orienting means for the passage through the cam member 72 and the slot 95 in bell guide shoe 92. Orienting arm 39b is released by orienting arm 39a, as hereinbefore described, and pivots upwardly to slidably engage the inner wall of cam member 72. Orienting arm 39a swings to a horizontal position when the pivoted end passes out of the tubular extension 25.

The orienting arm 39b pivots outward to a horizontal position as it leaves the lower end of the cam member 72, as can be seen in FIG. 15. The bell guide shoe 92 has a downwardly sloping surface and thereby retains orienting arm 39a in slot 95 until orienting arm 39b pivots outwardly far enough to embrace the second tubing string 27 to prevent the perforating apparatus from rotating to the right.

The orienting arms 39a and 39b loosely embrace or straddle the second tubing string to maintain the oriented position of the perforating apparatus as it is lowered to position the perforating units 35 opposite the formation A to be perforated. It is preferred to make the orienting arms 39a and 39b of a length which exceeds the radius of the casing 22 to insure that the arms will not clear the second tubing string 27 to permit the perforating apparatus 33 to rotate when it is laterally displaced the maximum distance in the casing from the second tubing string. The arcuate sector between the orienting arms defines a safe zone extending the length of the perforating apparatus and includes the section of the second tubing string adjacent to the perforating apparatus. The perforating units are positioned in the carrier to direct their perforating means into the remaining arcuate sector surrounding the perforating apparatus in order to prevent perforation of the second tubing string; thus, the operative surface of the perforator is directed toward the well wall and away from the second string of tubing.

Figure 20:
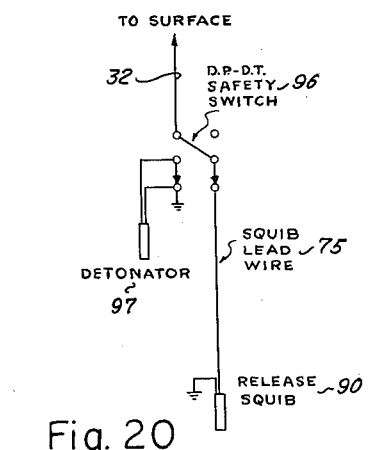
FIG. 20 is a schematic diagram of the release and firing circuit of the present invention.
Figure 16:
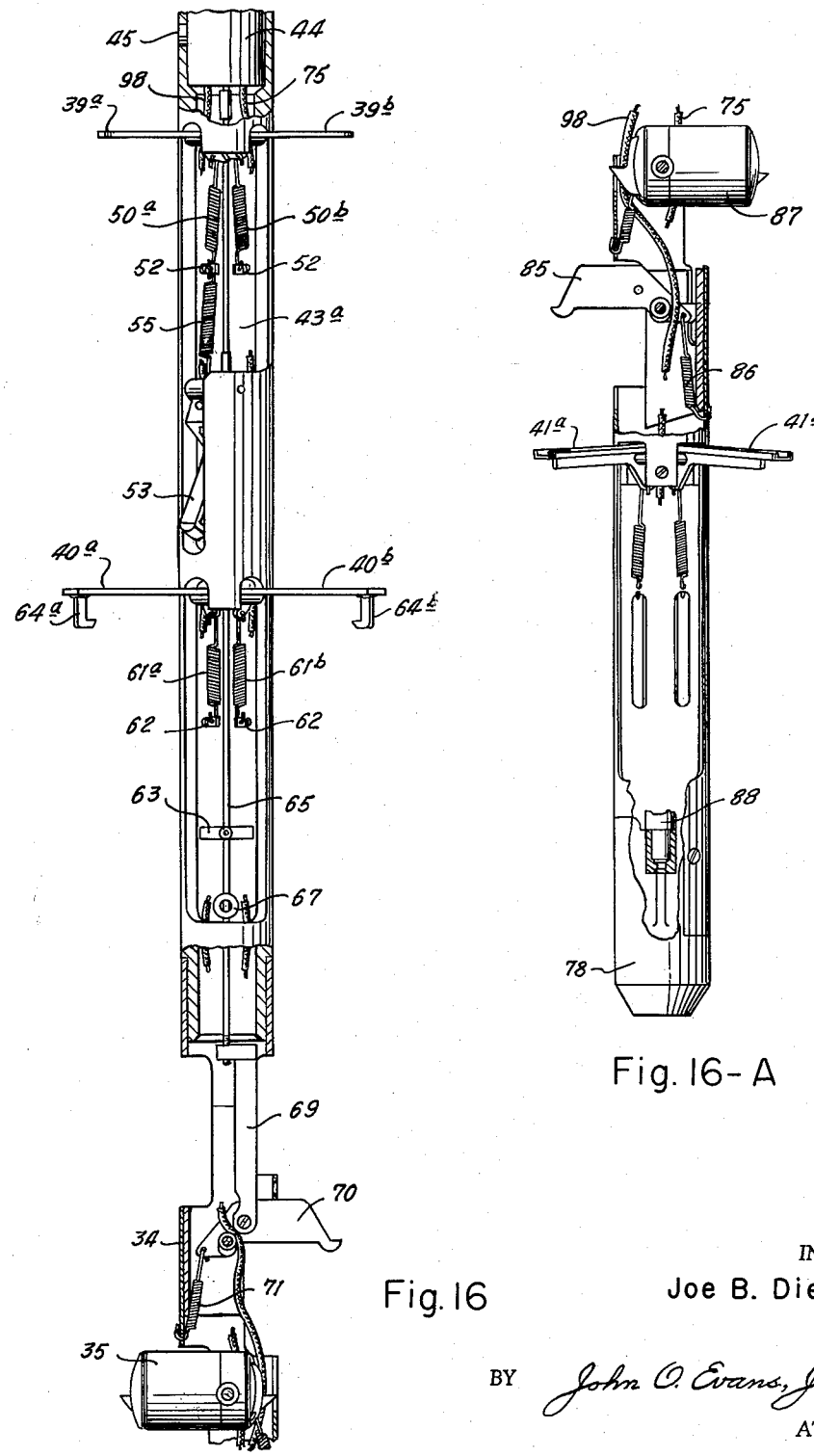
FIG. 16 is a vertical, partial section view of the upper end of a perforating apparatus with the positioning arms, pusher legs and perforating unit extended in a horizontal direction.

When the perforating units 35 are positioned opposite the formation A, a switch on the earth's surface is closed to supply electrical energy through cable 32 to a D.P.D.T. safety switch 96 in the firing head 38, as can be seen in FIG. 20. The electrical lead wire 75 connected to the switch conducts the electrical energy to detonate the explosive squib 90 contained in frangible locking member 88. Upon detonation of the squib, the locking member fragments, freeing the lower ends of the lower pusher legs 41a and 41b from the fingers 89a and 89b. Urged by the two springs, the lower pusher legs pivot upward and outward through the opening 77 in the bull nose member to a horizontal position, as can be seen in FIG. 16A. The latch member 84 on lower pusher leg 41b disengages from the lower end of the lower release member 85 when the leg pivots out. Pivoting outwardly under the urging of spring 86, the lower release member disengages the detent on the lower end of the lowermost perforating unit 87, permitting it to pivot to a horizontal position. The lowermost perforating unit releases the next perforating unit for similar pivotal movement to horizontal position, and the process is repeated to permit each perforating unit in the carrier to assume firing disposition. The uppermost perforating unit 35 releases the upper release member 70 to pivot upwardly, thereby raising the clevis 69 and the clevis extension rod 65. The T member 63 attached to the extension rod raises to release the fingers 64a and 64b on the upper pusher legs 40a and 40b, permitting the legs to pivot to the horizontal position, as can be seen in FIG. 16.

Figure 17:
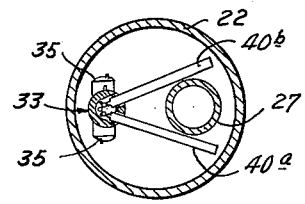
FIG. 17 is a cross-section view taken on line 17—17 of FIG. 1.
Figure 18:
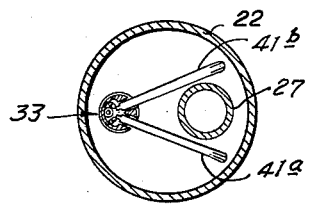
FIG. 18 is a cross-section view taken on line 18—18 of FIG. 1.

The upper and lower sets of pusher legs have a greater length than the orienting arms and are positioned to subtend a smaller angle when extended. Thus, upon release, they swing out to straddle the second string of tubing before they reach the horizontal position. Under the urging of the springs attached to the perforating apparatus and the pivoted ends of the pusher legs, the perforating apparatus is pushed laterally away from the second tubing string as the legs swing to the horizontal position, the ends of the legs pushing against the casing wall to accomplish this result. As illustrated in FIGS. 1, 17 and 18, the two sets of pusher legs straddle the second tubing string and are in contact with or close to each side thereof. The two sets of pusher legs serve to move the perforating apparatus laterally away from the second tubing string and, also, to maintain the perforating apparatus in the same oriented position established by the orienting arms.

A short interval of time is permitted to elapse between firing the squib 90 in the frangible member 88 and firing the perforating units 35. This is required to insure that all the perforating units have pivoted to the horizontal positions and that the upper and lower pusher legs have had sufficient time to extend to the horizontal position to move the perforating apparatus the maximum lateral distance from the second string of tubing. The firing head 38 is armed, in the manner described in the beforementioned application and published article, by safety switch 96 completing a circuit to a detonator explosive 97 contained in the firing head as shown in FIG. 20. The detonator explosive fires the detonator fuse 98 which, in turn, detonates the perforating units 35 to perforate the casing and the adjacent earth formation A.

The carrier 34 is constructed with thin metal walls and will break up into relatively small pieces upon detonation of the perforating units 35 when shaped charges are used to perforate the well. The bull nose member 36 will drop down on top of the lower packer 28 together with the debris from the carrier. The orienting and positioning member 37 remains intact, or substantially so, and attached to the firing head 38. During retrieval of the orienting and positioning member and the firing head from the well, the top of the firing head may not be in vertical alignment with the tubular extension 25 and cam member 72. The top of the firing head contacts the downwardly sloping under surface of the bell guide shoe and is guided thereby into the tubular cam member 72 without fouling between the casing and the lower end of the cam member. The retrieval of the orienting and positioning member and the firing head permits these assemblies to be used again, with little or no repair, on another perforating apparatus.

The perforating apparatus can be retrieved in an unfired condition after the pusher legs and perforating units have been released to pivot to the horizontal position by firing the release squib. Retrieval may be necessary should a malfunction of the firing train occur after the release squib has been fired. The orienting arms, pusher legs, release members and perforating units are all pivotally mounted at their upper ends and maintained in the horizontal position by springs. Thus, when retrieved in an unfired condition, all the horizontally projecting members will pivot downward by being wiped against the bottom of the bell guide shoes as the perforating apparatus is pulled up through the bell guide shoe into the cam member and on up the tubing to the surface.

It is contemplated that other forms of perforating units and carriers therefor may be employed and it is to be understood that the apparatus of the present invention is not limited to the tilting perforating units and carrier herein described and depicted.

While there has been described what is at present considered a preferred embodiment of the present invention, it will be apparent to those skilled in the art that various modifications and changes may be made without departing from the essence of the invention and, particularly, that the invention herein is adapted to various other oil well tools than perforating apparatus. It is intended to cover herein all such modifications and changes as come within the true scope and spirit of the following claims.

I claim:

1. A well perforating assembly for perforating a well having disposed therein a first tubing string open at the lower end and a second tubing string axially off-set from and extending below the lower end of said first string comprising: a vertically elongated carrier; well perforating means mounted in said carrier, said carrier and said perforating means being adapted to pass through said first tubing string and out of the lower end thereof and said perforating means being adapted to perforate said well adjacent to and at the side of said second string of tubing below said first string; means for lowering and suspending said carrier through and below said first string of tubing; means on said carrier adapted to cooperate means on the lower end of said first string of tubing and responsive to movement of said carrier therethrough to orient said carrier so that said perforating means is directed toward the wall of the well and away from said second string of tubing; a pair of arms normally disposed within said carrier; aperture means provided in said carrier adjacent to said arms; supports in said carrier mounting said arms for movement from within said carrier to positions in which portions of said arms project laterally outwardly through said aperture means at an acute horizontal angle to each other to embrace the second string of tubing when said carrier is in said oriented position; and means for moving said arms from within said carrier to said outwardly projecting positions upon emergence of said carrier from the lower end of said first string of tubing while said carrier is in said oriented position.

2. A well perforating assembly for perforating a well having disposed therein a first tubing string open at the lower end and a second tubing string axially offset from and extending below the lower end of said first string comprising: a vertically elongated carrier; well perforating means mounted in said carrier, said carrier and said perforating means being adapted to pass through said first tubing string and out of the lower end thereof and said perforating means being adapted to perforate said well adjacent to and at the side of said second string of tubing below said first string; means for lowering and suspending said carrier through and below said first string of tubing; means on said carrier adapted to cooperate with means on the lower end of said first string of tubing and responsive to movement of said carrier therethrough to orient said carrier so that said perforating means is directed toward the wall of the well and away from said second string of tubing; means mounted on said carrier and cooperable directly with said second string of tubing to retain said carrier in its oriented position after passing through said orienting means and to permit vertical and free lateral movement of said carrier with respect to said second string; and at least one pair of members mounted on said carrier extendible laterally therefrom upon command of a signal given from the surface of the earth, said members when extended being laterally spaced from each other and disposed on said carrier to straddle said second string of tubing and acting against a rigid surface within said well to move said carrier laterally away from said second string of tubing into a position adjacent the wall of said well opposite said second string of tubing; and power means actuable upon command of said signal to laterally extend said members.

3. A well perforating assembly for perforating a well having disposed therein a first tubing string open at the lower end and a second tubing string axially off-set from and extending below the lower end of said first string comprising: a vertically elongated carrier; well perforating means mounted in said carrier, said carrier and said perforating means being adapted to pass through said first tubing string and out of the lower end thereof and said perforating means being adapted to perforate said well adjacent to and at the side of said second string of tubing below said first string; means for lowering and suspending said carrier through and below said first string of tubing; means on said carrier adapted to cooperate with means on the lower end of said first string of tubing and responsive to movement of said carrier therethrough to orient said carrier so that said perforating means is directed toward the wall of the well and away from said second string of tubing; a pair of arms pivotally mounted within said carrier and spring biased for movement upon release to positions in which said arms project outwardly from said carrier, said arms being spaced laterally from each other and positioned to embrace the second string of tubing and being slidable along said second string of tubing to retain said carrier in its oriented position after said carrier has been oriented in response to passage through the lower end of said first string of tubing; release means to permit outward movement of said pivotally mounted spring biased arms; upper and lower pairs of pusher legs pivotally mounted within said carrier and spring biased for movement upon release to positions in which said legs project outwardly from said carrier, the legs of each pair being spaced from each other to embrace the second tubing string and adapted to urge said carrier laterally away from said second string of tubing; and release means to permit outward movement of said pivotally mounted spring biased pairs of pusher legs.

4. A well perforating assembly for perforating a well having disposed therein a first tubing string open at the lower end and a second tubing string axially offset from and extending below the lower end of said first string comprising: a vertically elongated carrier; well perforating means mounted in said carrier, said carrier and said perforating means being adapted to pass through said first tubing string and out of the lower end thereof and said perforating means being adapted to perforate said well adjacent to and at the side of said second string of tubing below said first string; means for lowering and suspending said carrier through and below said first string of tubing; means to orient said carrier so that said well perforating means is directed toward the wall of the well and away from said second tubing string; a restrained movably mounted member attached to said carrier, said member being biased for movement to a position in which said member projects laterally outwardly from said carrier; restraining means preventing said member from moving to said lateral position after said carrier passes out of the lower end of said first string of tubing; release means actuable upon command of a signal given from the surface of the earth for releasing said restraining means; and biasing means to move said member laterally outwardly from said carrier to non-interlockingly engage a stationary surface within said well whereby said carrier is moved laterally a substantial distance from said second string of tubing prior to firing said well perforating means.

5. A well perforating assembly for perforating a well having disposed therein a first tubing string open at the lower end and a second tubing string axially off-set from and extending below the lower end of said first string comprising: a vertically elongated carrier; well perforating means mounted in said carrier, said carrier and said perforating means being adapted to pass through said first tubing string and out of the lower end thereof and said perforating means being adapted to perforate said well adjacent to and at the side of said second string of tubing below said first string; means for lowering and suspending said carrier through and below said first string of tubing; means to orient said carrier so that said well perforating means is directed toward the wall of the well and away from said second tubing string; at all levels below the lower end of said first string and above the bottom of said second string, said orienting means permitting lateral movement of said carrier with respect to said second string; a pair of pusher legs pivotally mounted on said carrier normally disposed substantially parallel to the horizontal axis of said carrier, said legs being mounted for movement into positions in which said legs project laterally outwardly from said carrier at an acute horizontal angle to each other to straddle said second string of tubing and to make engagement with a rigid surface within said well to move said carrier laterally away from said second string of tubing prior to firing said well perforating means; and power means to urge said pusher legs into the laterally extended position, said power means being operable upon command of a signal given from the surface of the earth.

6. A well perforating assembly for perforating a well having disposed therein a first tubing string open at the lower end and a second tubing string axially offset from and extending below the lower end of said first string comprising: a vertically elongated carrier; a plurality of shaped charges pivotally mounted on said carrier; cooperating detents on adjacent shaped charges interlocking said shaped charges in axial disposition with respect to said carrier; a lower locking member pivotally mounted on said carrier and engaging the lowermost shaped charge to prevent pivotal movement thereof; resilient means urging said shaped charges and lower locking member from axial to transverse disposition upon release of said lower locking member; means for lowering and suspending said carrier through and below said first string of tubing; means on said carrier adapted to cooperate with means on the lower end of said first string of tubing and responsive to movement of said carrier therethrough to orient said carrier so that said shaped charges are directed toward the wall of the well and away from said second string of tubing; a pair of arms pivotally mounted within said carrier and spring biased for movement upon release to positions in which said arms project laterally outwardly from said carrier, said arms being spaced laterally from each other and positioned to embrace the second string of tubing and being slidable vertically and horizontally on said second string of tubing to retain said carrier in its oriented position after said carrier has been oriented by said means on said carrier and said means on said lower end of said first string of tubing; first release means to permit outward movement of said pivotally mounted spring biased arms; upper and lower pairs of pusher legs pivotally mounted within said carrier and spring biased for movement upon release to positions in which said legs project laterally outwardly from said carrier, the legs of each pair being laterally spaced from each other and positioned to embrace the second string of tubing and adapted to engage a portion of the well structure to urge said carrier laterally away from the second string of tubing; second release means normally restraining and upon release permitting outward movement of said lower pair of pusher legs, said lower pair of pusher legs cooperating with said lower locking member to release said lower locking member and, in turn, to release said plurality of interlocked shaped charges; a mechanism including an upper locking member normally restraining said upper pair of pusher legs within said carrier and releasable to permit said legs to move as aforesaid; and means responsive to pivoting of the uppermost shaped charge for releasing said upper locking member.

References Cited in the file of this patent

UNITED STATES PATENTS

| | | |
|---|---|---|
| 1,526,274 | Fitzsimons et al. | Feb. 10, 1925 |
| 2,418,728 | Sanders | Apr. 8, 1947 |
| 2,664,162 | Howard et al. | Dec. 29, 1953 |
| 2,679,903 | McGowen et al. | June 1, 1954 |
| 2,689,007 | Beger | Sept. 14, 1954 |
| 2,785,754 | True | Mar. 19, 1957 |
| 2,891,620 | Billstein | June 23, 1959 |

FOREIGN PATENTS

| | | |
|---|---|---|
| 1,139,343 | France | Feb. 11, 1957 |

UNITED STATES PATENT OFFICE
CERTIFICATE OF CORRECTION

Patent No. 3,063,372

November 13, 1962

Joe B. Diebold

It is hereby certified that error appears in the above numbered patent requiring correction and that the said Letters Patent should read as corrected below.

Column 8, line 34, after "cooperate" insert -- with --.

Signed and sealed this 18th day of June 1963.

(SEAL)
Attest:

ERNEST W. SWIDER
Attesting Officer

DAVID L. LADD
Commissioner of Patents